United States Patent
Dixit (10) Patent No.: US 10,823,471 B2
(45) Date of Patent: Nov. 3, 2020

(54) REFRIGERANT TRANSFER CONTROL IN MULTI MODE AIR CONDITIONER WITH HOT WATER GENERATOR

(71) Applicant: CARRIER CORPORATION, Palm Beach Gardens, FL (US)

(72) Inventor: Rishabh Dixit, Haryana (IN)

(73) Assignee: CARRIER CORPORATION, Palm Beach Gardens, FL (US)

(*) Notice: Subject to any disclaimer, the term of this patent is extended or adjusted under 35 U.S.C. 154(b) by 189 days.

(21) Appl. No.: 16/039,027

(22) Filed: Jul. 18, 2018

(65) Prior Publication Data
US 2019/0360731 A1    Nov. 28, 2019

(51) Int. Cl.
F25B 49/02        (2006.01)
F25B 41/04        (2006.01)
(Continued)

(52) U.S. Cl.
CPC .......... *F25B 41/04* (2013.01); *F24D 19/1054* (2013.01); *F24H 4/02* (2013.01);
(Continued)

(58) Field of Classification Search
CPC .............. F25B 2500/07; F25B 2600/25; F25B 2600/2501; F25B 2700/1931; F24F 5/00;
(Continued)

(56) References Cited

U.S. PATENT DOCUMENTS 4,693,089 A * 9/1987 Bourne ............... F24D 3/08 62/79
4,893,476 A * 1/1990 Bos ................... F24D 11/0214 62/79
(Continued)

FOREIGN PATENT DOCUMENTS

| CN | 202304094 U | 7/2012 |
|---|---|---|
| DE | 102007037349 A1 | 2/2008 |
| EP | 2434233 A2 | 3/2012 |
| JP | H02187573 A | 7/1990 |
| JP | 2007093100 A | 4/2007 |

(Continued)

OTHER PUBLICATIONS

"Control Method of Circulating Refrigerant Amount for Heat Pump System"; Jin Woo Yoo et al.; Purdue University, Purdue e-Pubs; International Refrigeration and Air Conditioning Conference, School of Mechanical Engineering; http://docs.lib.purdue.edu/iracc; 2014; 9 pgs.

(Continued)

*Primary Examiner* — Jonathan Bradford
(74) *Attorney, Agent, or Firm* — Cantor Colburn LLP (57) ABSTRACT

A method for controlling an operating discharge pressure in a multi-purpose HVAC system including an outdoor unit, and an indoor unit, the HVAC system including a plurality of flow control valves configured to isolate the indoor unit from the multi-purpose HVAC system, a compressor and a controller, operably coupled to a water heater module, the water heater module including at least one valve, the controller executing a method including operating the multi-purpose HVAC system in a water heating mode, monitoring the operating discharge pressure from the compressor; and generating a signal commanding at least one of the plurality of control valves to isolate the indoor unit from the outdoor unit and water heating module and direct high pressure refrigerant to the indoor unit when the operating discharge pressure is greater than or equal to a predetermined pressure value.

18 Claims, 7 Drawing Sheets

(51) Int. Cl.
  *F25B 40/04* (2006.01)
  *F24H 4/02* (2006.01)
  *F24D 19/10* (2006.01)
  *F24D 3/18* (2006.01)
  *F24D 17/02* (2006.01)

(52) U.S. Cl.
  CPC .............. *F25B 40/04* (2013.01); *F25B 49/02* (2013.01); *F24D 3/18* (2013.01); *F24D 17/02* (2013.01); *F24F 2221/183* (2013.01); *F25B 2300/00* (2013.01); *F25B 2313/02741* (2013.01); *F25B 2339/047* (2013.01); *F25B 2500/07* (2013.01); *F25B 2500/21* (2013.01); *F25B 2600/2513* (2013.01); *F25B 2700/1931* (2013.01)

(58) Field of Classification Search
  CPC ........ F24F 2221/183; F24H 4/00; F24H 4/02; F24H 4/04; F24D 17/02; F24D 19/1054
  See application file for complete search history.

(56) References Cited

U.S. PATENT DOCUMENTS

| | | | |
|---|---|---|---|
| 5,673,567 A | 10/1997 | Dube | |
| 7,299,649 B2* | 11/2007 | Healy | F25B 1/04 62/324.4 |
| 7,377,119 B2 | 5/2008 | Kim et al. | |
| 8,109,105 B2 | 2/2012 | Unezaki et al. | |
| 8,806,877 B2 | 8/2014 | Tamaki et al. | |
| 9,188,376 B2 | 11/2015 | Tamaki et al. | |
| 10,006,670 B2* | 6/2018 | Leman | F25B 13/00 |
| 2009/0049857 A1* | 2/2009 | Murakami | F25B 13/00 62/324.6 |
| 2012/0055177 A1* | 3/2012 | Kim | F24D 11/0214 62/79 |
| 2013/0104574 A1* | 5/2013 | Dempsey | F25B 29/003 62/79 |
| 2015/0052914 A1 | 2/2015 | Leman et al. | |

FOREIGN PATENT DOCUMENTS

| | | |
|---|---|---|
| JP | 2017020722 A | 1/2017 |
| JP | 2017138037 A | 8/2017 |

OTHER PUBLICATIONS

"Research on the Air Conditioning Water Heater System"; Fei Liu et al.; Purdue University, Purdue e-Pubs; International Refrigeration and Air Conditioning Conference, School of Mechanical Engineering; http://docs.lib.purdue.edu/iracc; 2008; 9 pgs.

* cited by examiner

REFRIGERANT TRANSFER CONTROL IN MULTI MODE AIR CONDITIONER WITH HOT WATER GENERATOR

CROSS-REFERENCE TO RELATED APPLICATIONS

This application claims the benefit of Indian Application No. 201811019270 filed May 23, 2018, which is incorporated herein by reference in its entirety.

TECHNICAL FIELD OF THE DISCLOSED EMBODIMENTS

The presently disclosed embodiments generally relate to systems for heating water and conditioning an interior space, and more particularly, to a system and method for controlling discharge pressure and refrigerant flow in a multi-purpose heating, ventilation, and air-conditioning (HVAC) system.

BACKGROUND OF THE DISCLOSED EMBODIMENTS

A typical water heater for residential hot water production and storage is an electrical resistance water heater and storage tank, although gas water heaters are also used to heat water in a storage tank. Water heaters typically include a storage tank defining a chamber for retention of water. A water inlet pipe is provided with a first connection for interconnection with a cold water supply line that conveys fresh, relatively cold water into the storage tank. In the case of electrical resistance water heaters, there are electrical resistance elements, within the storage tank, that heat the water.

An alternative method for heating water is an active desuperheater water heater. In one example of an active desuperheater water heater, the active desuperheater water heater uses a small pump to circulate water from a water storage tank, through a heat exchanger, and back into the water storage tank. The active desuperheater water heater intercepts the superheated hot gas that is rejected from an air conditioner or heat pump compressor, sifting outside the home, and transfers the heat to the water circulating through the heat exchanger. Typically, the active desuperheater water heater works only when the air conditioner or heat pump is operating in the cooling mode.

Another alternative method for heating water is a heat pump water heater. A heat pump water heater contains a fan, compressor, and an evaporator configured to sit on top of the water storage tank. The heat pump water heater circulates a refrigerant through an evaporator and compressor, and uses a fan and evaporator to pull heat from air surrounding the heat pump water heater in order to heat the refrigerant. The heated refrigerant runs through a condenser coil within the water storage tank, transferring heat to the water stored therein.

Yet another alternative method for heating water is a HVAC system coupled with a water heater module to form a multi-purpose system. This multi-purpose system utilizes a water heater module to divert a refrigerant to an indoor unit assembly when conditioning an interior space, or to the water heater module's heat exchanger when heating water. The outdoor heat pump circulates a refrigerant through an evaporator and compressor, and uses a fan and the evaporator to pull heat from air surrounding the heat pump in order to heat the refrigerant. The heated refrigerant runs through the water heater module heat exchanger, transferring heat to water also circulating through the water heater module heat exchanger.

During water heating operation, the operating discharge pressure within the outdoor heat pump may increase to levels that make the water heating cycle inefficient at a minimum, or may cease operation of the system. Generally, to control the discharge pressure, a thermostatic expansion valve is used to regulate the refrigerant flow into the evaporator. Generally, the function of the thermostatic expansion valve is to hold a constant evaporator superheat. When set and operating properly, the thermostatic expansion valve will keep the evaporator active throughout its entire length. However, use of a thermostatic expansion valve in a multi-purpose system requires use of additional valves, expansion tanks, accumulators, and the like to relieve pressure throughout the system for optimal performance particularly when operating in water heating only mode. Therefore, there is a need for a method to control the operating discharge pressure in a multi-purpose HVAC system and maintain desired performance without employing expensive additional components.

SUMMARY OF THE DISCLOSED EMBODIMENTS

In one aspect, disclosed herein in an embodiment is a method for controlling an operating discharge pressure in a multi-purpose HVAC system including an outdoor unit, and an indoor unit, the HVAC system including a plurality of flow control valves configured to isolate the indoor unit from the multi-purpose HVAC system, a compressor and a controller, operably coupled to a water heater module, the water heater module including at least one valve, the controller executing a method including operating the multi-purpose HVAC system in a water heating mode, monitoring the operating discharge pressure from the compressor; and generating a signal commanding at least one of the plurality of control valves to isolate the indoor unit from the outdoor unit and water heating module and direct high pressure refrigerant to the indoor unit when the operating discharge pressure is greater than or equal to a predetermined pressure value.

In addition to one or more of the features described above, or as an alternative, further embodiments may also include operating the controller to remove the signal commanding at least one of the plurality of control valves to isolate the indoor unit assembly from the outdoor unit assembly and water heating module when the operating discharge pressure is less than the predetermined pressure value.

In addition to one or more of the features described above, or as an alternative, further embodiments may also include operating the controller to remove the signal commanding at least one of the plurality of control valves to isolate the indoor unit assembly from the outdoor unit assembly and water heating module when the multi-purpose HVAC system stops operating in a water heating mode.

In addition to one or more of the features described above, or as an alternative, further embodiments may also include that the at least one valve comprises a four-way valve.

In addition to one or more of the features described above, or as an alternative, further embodiments may also include that the at least one valve includes a first valve coupled to an inlet of a heat exchanger configured to transfer heat to water, a second valve having a first side coupled to a heat exchanger of the outdoor unit, and a second side coupled to the indoor unit in fluid communication with an outlet of a heat exchanger of the indoor unit, a third valve having a first side coupled to an inlet to the heat exchanger of the indoor unit and a second side coupled to a fourth port of a four way valve, and a fourth valve having an inlet coupled to a discharge port on the compressor and an outlet coupled to the inlet to the heat exchanger of the indoor unit. The operating the controller to produce a signal comprises opening the first and fourth valves and closing the second and third and fourth valves.

In addition to one or more of the features described above, or as an alternative, further embodiments may also include that the at least one refrigerant circuit circulates a refrigerant from the outdoor unit assembly, through the water heater module, and returns to the outdoor unit assembly.

In addition to one or more of the features described above, or as an alternative, further embodiments may also include controlling a flow of refrigerant into a heat exchanger of the outdoor unit in a water heating only operating mode for the multi-mode HVAC system with a refrigerant flow control device, the refrigerant flow control device comprising an expansion valve.

In addition to one or more of the features described above, or as an alternative, further embodiments may also include bypassing the refrigerant flow control device when not operating the multi-mode HVAC system in a water heating only mode.

In addition to one or more of the features described above, or as an alternative, further embodiments may also include controlling a superheat value of the HVAC system with an electronic expansion valve, the electronic expansion valve in fluid communication with a heat exchanger of the indoor unit assembly.

In addition to one or more of the features described above, or as an alternative, further embodiments may also include maintaining a desired refrigerant level in the HVAC system with a flow restriction in fluid communication with a suction port of the compressor and a fifth flow control valve, in fluid communication with an inlet to the heat exchanger of the indoor unit.

In another aspect of the described embodiments, also described herein is a multi-purpose HVAC system. The multi-purpose HVAC system including an outdoor unit assembly including a compressor, a four-way valve, an expansion valve and a heat exchanger, an indoor unit assembly, a water heater module including at least one valve, a heat exchanger, a controller operably connected to the outdoor unit assembly, indoor unit assembly and the water heater module, and a plurality of conduits operatively coupling the water heater module to the outdoor unit assembly and the indoor unit assembly. In the multi-purpose HVAC system, the controller is configured to operate the multi-purpose HVAC system in a water heating mode, monitor the operating discharge pressure from the compressor, and operate the controller to produce a signal commanding at least one of the plurality of control valves to isolate the indoor unit assembly from the outdoor unit assembly and water heating module and direct high pressure refrigerant to the indoor unit assembly when the operating discharge pressure is greater than or equal to a predetermined pressure value.

In addition to one or more of the features described above, or as an alternative, further embodiments may also include the at least one valve comprises a four-way valve.

In addition to one or more of the features described above, or as an alternative, further embodiments may also include that one or more of the at least one valves is configured in at least one refrigerant circuit to circulate a refrigerant from the outdoor unit assembly through the water heater module, and returns to the outdoor unit assembly.

In addition to one or more of the features described above, or as an alternative, further embodiments may also include that the controller is configured to remove the signal commanding at least one of the plurality of control valves to isolate the indoor unit assembly from the outdoor unit assembly and water heating module and direct high pressure refrigerant to the indoor unit assembly when the operating discharge pressure is less than a predetermined pressure value.

In addition to one or more of the features described above, or as an alternative, further embodiments may also include that the at least one valve includes a first valve coupling the first valve to an inlet of the heat exchanger configured to transfer heat to water, a second valve having a first side coupled to a heat exchanger of the outdoor unit, and a second side coupled to the indoor unit in fluid communication with an outlet of a heat exchanger of the indoor unit, a third valve having a first side coupled to an inlet to the heat exchanger of the indoor unit and a second side coupled to a fourth port of a four way valve, and a fourth valve having an inlet coupled to a discharge port on the compressor and an outlet coupled to the inlet to the heat exchanger of the indoor unit. In addition, operating the controller to produce a signal opening the first and fourth valves and closing the second and third and fourth valves.

In addition to one or more of the features described above, or as an alternative, further embodiments may also include a refrigerant flow control device configure to control a flow of refrigerant into a heat exchanger of the outdoor unit in a water heating only operating mode for the multi-mode HVAC system, the refrigerant flow control device including an expansion valve.

In addition to one or more of the features described above, or as an alternative, further embodiments may also include a flow control valve operably coupled to the refrigerant flow control device and configured to bypass the refrigerant flow control device when not operating the multi-mode HVAC system in a water heating only mode.

In addition to one or more of the features described above, or as an alternative, further embodiments may also include an electronic expansion valve, the electronic expansion valve in fluid communication with a heat exchanger of the indoor unit assembly, the electronic expansion device in operable communication with the controller and configured to receive signals therefrom for controlling a superheat value of the HVAC system.

In addition to one or more of the features described above, or as an alternative, further embodiments may also include a flow restriction in fluid communication with a suction port of the compressor and a fifth flow control device in fluid communication with an inlet to the heat exchanger of the indoor unit, the fifth flow control device in operable communication with the controller and configured to maintain a desired refrigerant level in the HVAC system.

The foregoing features and elements may be combined in various combinations without exclusivity, unless expressly indicated otherwise. It should be understood, however, that the following description and drawings are intended to be illustrative and explanatory in nature and non-limiting.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

DETAILED DESCRIPTION OF THE DISCLOSED EMBODIMENTS

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended. The following description is merely illustrative in nature and is not intended to limit the present disclosure, its application or uses. It should be understood that throughout the drawings, corresponding reference numerals indicate like or corresponding parts and features. As used herein, the term controller refers to processing circuitry that may include an application specific integrated circuit (ASIC), an electronic circuit, an electronic processor (shared, dedicated, or group) and memory that executes one or more software or firmware programs, a combinational logic circuit, and/or other suitable interfaces and components that provide the described functionality.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection".

Embodiments described herein are directed to a method and system for discharge pressure management based on employing a refrigerant management technique to use air conditioner's indoor unit internal volume to control refrigerant levels under various operating conditions. During different modes of operation for the multi-mode air conditioning system, different amounts of refrigerant are required in various operational modes for efficient, optimal operation. In an embodiment, separate bypass transfer lines are employed between compressor discharge and suction, and field piping between the air conditioner's outdoor unit and indoor unit via solenoid isolation valves downstream the main solenoid valve between indoor & outdoor unit. In operation, this system transfers extra refrigerant charge of the active circuit into the indoor unit and connecting piping, which is an unused portion of the circuit during the hot water alone generation mode. With the use of solenoid valves and a pressure-temperature feedback mechanism, the amount of refrigerant is modulated real time to address high discharge pressure issues and improve system operation. Advantageously, the described embodiments employ existing parts of the refrigeration system to avoid using separate storage tanks or accumulators.

Figure 1:
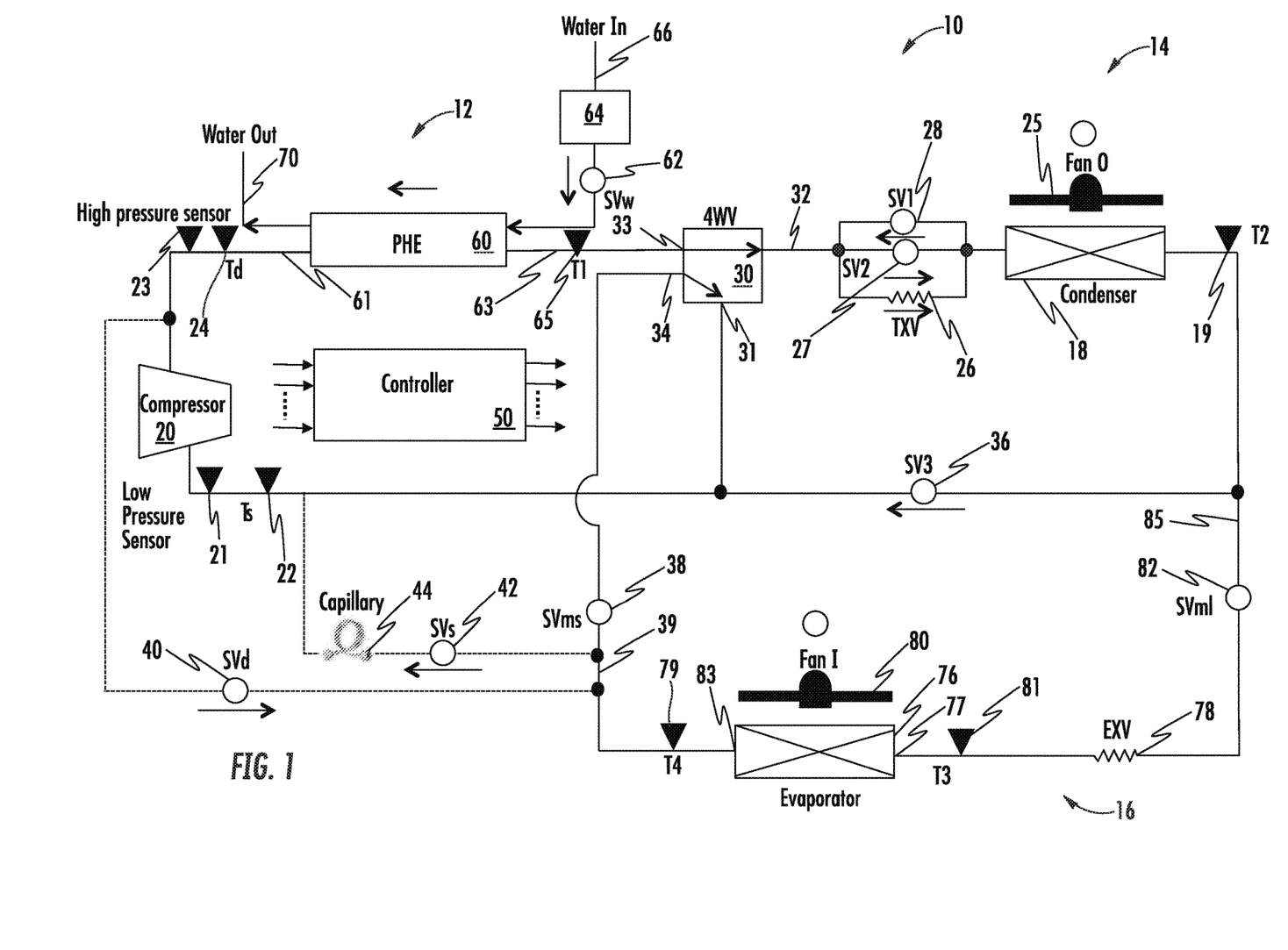
FIG. 1 is a general schematic diagram of a system for heating water and conditioning an interior space in accordance with an embodiment.

FIG. 1 illustrates a multi-purpose system for heating water and conditioning an interior space, in a general configuration and utilizing an embodiment of the present disclosure, indicated generally as 10. In particular, the multi-purpose system 10 includes a water heater module indicated generally as 12 operably coupled to an outdoor unit assembly 14 and an indoor unit assembly 16 via selectively controlled valves and conduits to facilitated operation in various modes.

In one embodiment, outdoor unit assembly 14 includes a heat exchanger 18, a compressor 20, a fan 25, four way valve 30, and an expansion device 26 including an orifice (not shown). Outdoor unit assemblies 14 include, but are not limited to air conditioning condensers, air-to-air or ground source heat pumps. The compressor 20 operates to take low pressure low temperature refrigerant at low pressure or suction port compressing the refrigerant to a high pressure, high temperature vapor. In an embodiment a suction pressure sensor 21 and suction temperature sensor 22 measure the suction pressure and temperature of the refrigerant and a discharge pressure sensor 23 and discharge temperature sensor 24 are employed to measure the pressures and temperature at the discharge of the compressor 20 The expansion device 26 is fluidically coupled in parallel with a two valves 27, 28 configured to bypass the expansion device 26 under selected conditions for certain operational modes of the system 10. In an embodiment, the flow control valves 27, 28 are directional in their operation. In another embodiment, a single valve that is bidirectional in its operation may be employed. The expansion device 26 generally controls the amount of refrigerant flow into the heat exchanger 18 under selected conditions, and more particularly superheat during the water heating only mode for the system 10. The expansion device 26 may be an electronic expansion device or it may be a passive thermal expansion device 26. In an embodiment a thermal expansion device 26 is employed for simplicity. The outdoor unit assembly 14 may further include a temperature sensor 19 at the output of the heat exchanger 18 to facilitate monitoring the temperature of the refrigerant exiting the heat exchanger 18.

It will also be appreciated that to control the superheat in the multipurpose HVAC system 10 the controller 50, based on monitoring various system parameters commands the electronic expansion device 78 to expand or contract the orifice therein, and thereby restrict/increase the flow of refrigerant through the valve. Generally, to expand an orifice within the electronic expansion device 78, the controller 50 produces a signal that is applied to a motor (not shown) within the electronic expansion device 78, wherein the motor is used to open and close the orifice. In some embodiments, the motor rotates a fraction of a revolution for each signal sent by the first controller 24. Expanding the orifice within the electronic expansion device 78 allows more refrigerant to pass therethrough, thus, lowering the operating discharge pressure of the compressor 20.

Outdoor unit assembly 14 also includes a four way valve 30 fluidically coupled to a first port 31 to the low pressure or suction side of the compressor 20 and at a second port 32 connected to the expansion device 26 and two valves 27 and 28 and is configured to direct refrigerant thereto an therefrom under selected conditions. The outdoor unit assembly 14 also includes a bypass valve 36, fluidically connected between the one port of the heat exchanger 18 at a conduit 85 and the suction port of the compressor 20 as well as the first port 31 of the four way valve 30. In addition, a fourth port 34 of the four way valve 30 is fluidically connected to another flow control valve 38, which is subsequently fluidically connected to conduit 39. Further operation of the four way valve 30 will be addressed at a later point herein. Further yet, another flow control valve 40 is fluidically connected between the discharge port of the compressor 20 and the conduit 39. Finally, a flow limiting capillary tube is fluidically connected in series with another flow control valve 42 between the suction port of the compressor 20 and the conduit 39.

In one embodiment, water heater module 12 includes a heat exchanger 60 configured to allow a refrigerant to circulate therethrough. It will be appreciated that the heat exchanger 60 may be external of the water heater module 12. The water heater module 12 includes a valve 62 configured to direct the flow of the water therethrough. The refrigerant supply side inlet of heat exchanger 60 is coupled to the high pressure side of compressor 20 via a conduit 61. The refrigerant outlet of heat exchanger 60 is coupled to a third port 33 of the four way valve 30 via a conduit 63. A temperature sensor 65 is employed to measure the temperature of the refrigerant as it exits the heat exchanger 60. In one embodiment, water heater module 12 further includes a water pump 64 in series with flow control valve 62 to draw and circulate water therein. Water pump 64 is coupled to a water supply and storage via conduit 66 as is conventionally known. The water heater module 12 includes a water return connector 70, which is coupled to a water return side of heat exchanger 60.

A water storage tank (not shown) may be employed, and is configured to produce a signal to indicate when a water heating mode should be initiated. Water storage tank is typically fluidically coupled to the pump 64 via a conduit 66 and fluidically coupled to the water return connector 70. During a demand to heat water, water storage tank is configured to send a signal to water heater module 12 and/or controller 50 to operate in a water heating mode. During use, such a water storage tank would be conventionally connected with a domestic water supply line, and returns via domestic return line.

Indoor unit assembly 16 includes a heat exchanger 76, an indoor expansion device 78, and an indoor fan 80. Indoor unit assembly 16 includes, but is not limited to air handlers, fan coil units, portions of furnaces and the like. The indoor unit assembly 16 may further include temperature sensor 81 and 79 across the heat exchanger 76 to facilitate monitoring the temperature entering and exiting the heat exchanger 76 respectively. A first port 77 of the indoor heat exchanger 76 is fluidically coupled to the indoor expansion device 78 and configured to receive expanded refrigerant therefrom under selected conditions. In an embodiment the indoor expansion device 78 is an electronic expansion device, but it should be understood that other configurations for the expansion device 78 are possible including, but not limited to thermal expansion devices, metering valves, and capillary tubes. The other side of the indoor expansion device 78 is fluidically coupled to a flow control valve 82 such that the indoor unit assembly 16 is configured to transmit/receive refrigerant to/from the condenser 18 of the outdoor unit assembly 14 via conduit 85 under selected controllable conditions. The second port 83 of the indoor heat exchanger 76 is also fluidically coupled to conduit 39 and the control valves 38, 42, and 40. It will be appreciated that while the flow control valves 38, 42, and 40 are described in association with the indoor unit assembly 16, they readily could also be located with the outdoor unit assembly. Moreover, while each of the components of the system is described with respect to a particular orientation or partition of the overall system 10, such division is for illustration purposes only, and components may be located in various parts of the system without departing from the breadth and scope of the described embodiments.

A controller 50 is in electrical communication with the compressor 20; each of the plurality of flow control valves 27, 28, 62, 36, 38, 40, 42, and 82; the water pump 64; fans 25 and 80; and the electrical expansion device 78 for control of the system 10 and the various operating modes thereof. In an embodiment, one or more of the flow control valves 27, 28, 36, 38, 40, 42, 62, and 82 are unidirectional flow valves. However it will be appreciated that in some embodiments one or more of the flow control valves may be bidirectional. The controller 50 is also interfaced with the various sensors including, but not limited to the sensors identified such as, the suction pressure and temperature sensors 21, 22, the discharge pressure and temperature sensors 23, 24, the indoor unit heat exchanger temperature sensors 79, 81, and the temperature sensor 19 associated with the outdoor unit 14, and the temperature sensor 65 associated with the water heater heat exchanger 60. The controller 50 provides the outdoor unit assembly 14, indoor unit assembly 16, water heater module 12 with a variety of operation modes and control sequences to execute instructions during one of an interior space conditioning mode and water heating mode.

Controller 50 is in electrical communication with the water heater module 12, outdoor unit assembly 14, and indoor unit assembly 16 via a wired or wireless connections (not shown). Controller 50 is generally configured to execute a methodology to control the various functions and modes of the water heater module 12 outdoor unit assembly 14 and indoor unit assembly 16 between an interior space conditioning (heating or cooling) mode and the water heating mode as needed.

FIGS. 2, 3, 4, 5, and 6 illustrate an exemplary configuration for the multi-purpose system 10 for heating water and conditioning an interior space in accordance with one or more embodiments. In each of the figures representative of each of the mode configurations for the system 10, the refrigerant flow path is depicted as well as the status of the various flow control valves 27, 28, 62, 36, 38, 40, 42, and 82; the water pump 62; fans 25, and 80; and the electrical expansion device 78, and the like.

Figure 2:
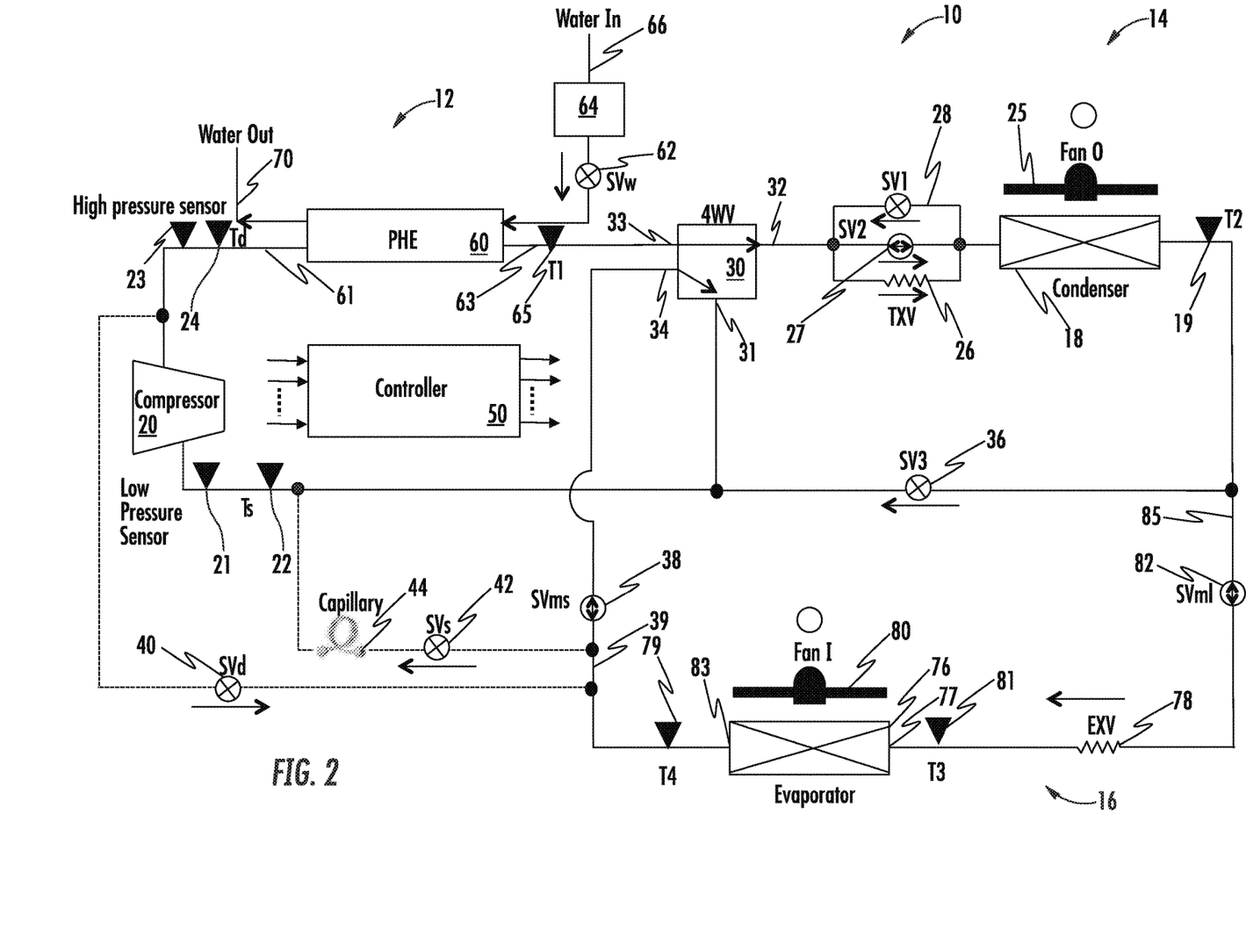
FIG. 2 is a schematic diagram of a system for heating water and conditioning an interior space in a cooling mode in accordance with an embodiment.

FIG. 2 depicts a configuration for the multi-purpose system 10 for heating water and conditioning an interior space in a cooling mode alone without water heating. In this embodiment, the system 10 operates as a conventional vapor compression cycle to provide cooling to an interior space. Refrigerant is compressed in the compressor 20, exiting the compressor 20 and passes through the heat exchanger 60 to the third port 33 of the four-way valve 30. Notably, in this mode the controller 50 has commanded flow control valve 40 denoted SVd closed and therefore this branch passes no refrigerant. In addition, little heat is dissipated in the water heater module at this point because the flow control valve 62, is also commanded by the controller 50 to the closed state and there is no call for water heating. The refrigerant exits the four-way valve 30 at the second port 32 and then passes through flow control valve 27 also denoted SV2, on to the heat exchanger 18 of the outdoor unit 14 to dissipate heat (typically to atmosphere (or the ground for heat pump applications)) and condense. Flow control valve 27 is commanded open by the controller 50 and bypasses flow control valve 28 and the thermal expansion valve 26 in this operating mode for the system 10. The cooled refrigerant is then transmitted to flow control valve 82, also denoted SVml via conduit 85, which is commanded open by the controller 50 and on to the electronic expansion valve 78. Flow control valve 36 is commanded closed in this mode, so that branch in the circuit passes no refrigerant. The electronic expansion valve 78 is in operable communication with the controller 50 and executes a method to control the flow of refrigerant passing therethrough in a conventional manner. The refrigerant is then directed to port 77 of the heat exchanger 76 within the indoor unit 16 where the refrigerant is evaporated. Controller 50 commands fan 80 to operate directing air from the building space over the heat exchanger 76 thereby cooling the air. Refrigerant is then directed out of the heat exchanger 76 via port 83 through flow control valve 38, also denoted SVms, which is commanded open in this mode and to the fourth port 34 of the four-way valve 30. The refrigerant exits the first port 31 of the four-way valve 30 to be directed to the suction side of the compressor 20 and repeat the cycle. Once again it should be noted that flow control valves 36, 42, and 40 are all closed in this mode of operation for the system.

Figure 3:
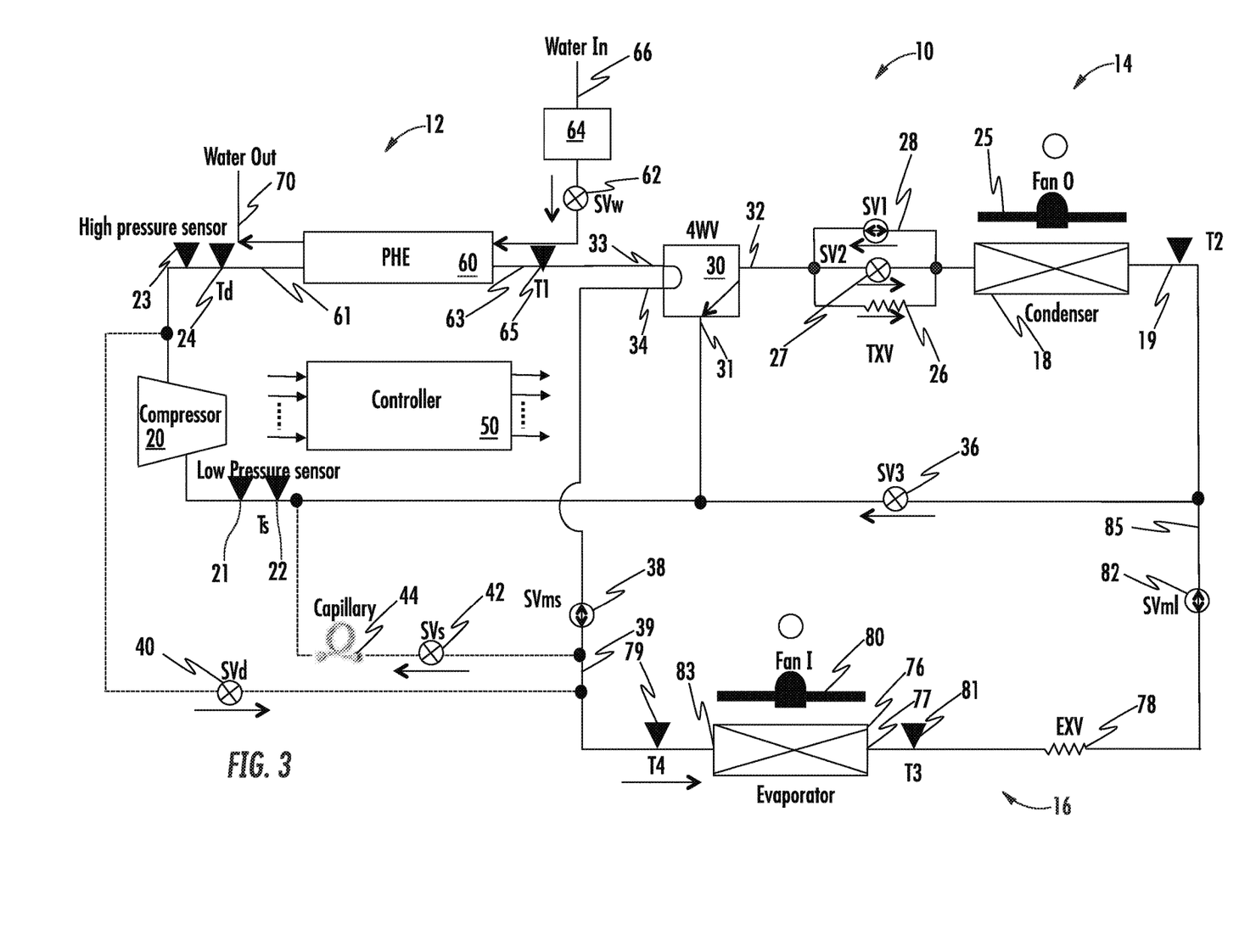
FIG. 3 is a schematic diagram of a system for heating water and conditioning an interior space in a heating mode in accordance with an embodiment.

FIG. 3 depicts a configuration for the multi-purpose system 10 for heating water and conditioning an interior space in a heating mode (without water heating). In this embodiment, the system 10 operates as a conventional vapor compression cycle to provide heating to an interior space. Refrigerant is compressed in the compressor 20, exiting the compressor 20 and passes through the heat exchanger 60 to the third port 33 of the four-way valve 30. Notably, once again, flow control valve 40 denoted SVd is commanded closed in this mode and therefore this branch passes no refrigerant. In addition, little heat is dissipated in the water heater module 12 at this point because the flow control valve 62, is also commanded closed by the controller 50 and there is no call for water heating. The refrigerant exits the four-way valve 30 at the fourth port 34 as the four-way valve 30 is commanded to the reversing position by the controller 50 and then passes through flow control valve 38 also denoted SVms, which is commanded open by controller 50, and on to port 83 of the heat exchanger 76 of the indoor unit 16 to condense and dissipate heat (to the building space). Controller 50 directs fan 80 to operate and direct air from the building space over the heat exchanger 76 thereby heating the air and the building space. Once again it should be noted that flow control valves 36, 42, and 40 are all commanded to the closed position in this mode of operation for the system 10. The now cooled refrigerant exits port 77 of the heat exchanger 76 of the indoor unit 16 and is then transmitted to, and metered by electronic expansion valve 78. The electronic expansion valve 78 receives commands from the controller 50 based on sensed operation of the system 10 and controls the opening and closing of an orifice therein and there by controlling the flow of refrigerant passing therethrough in a conventional manner. Refrigerant exiting the electronic expansion valve 78 is directed to flow control valve 82 (denoted SVml) which is commanded to the open position and via conduit 85, on to the heat exchanger 18 of the outdoor unit 14 where the refrigerant is evaporated. Flow control valve 36 once again is commanded by controller 50 to be closed in this mode, so that branch in the circuit passes no refrigerant. Evaporated refrigerant from the heat exchanger 18 of the outdoor unit 14 is then directed through flow control valve 28, also denoted SV1 which is commanded to the open state by controller 50 and then to the second port 32 of the four-way valve 30. The refrigerant exits the first port 31 of the four-way valve 30 to be directed to the suction side of the compressor 20 and repeat the cycle. Once again, it should be noted that controller 50 commands flow control valve 28 to the open state and thereby bypasses flow control valve 27 (which is commanded closed) and the thermal expansion valve 26 in this operating mode for the system 10.

Figure 4:
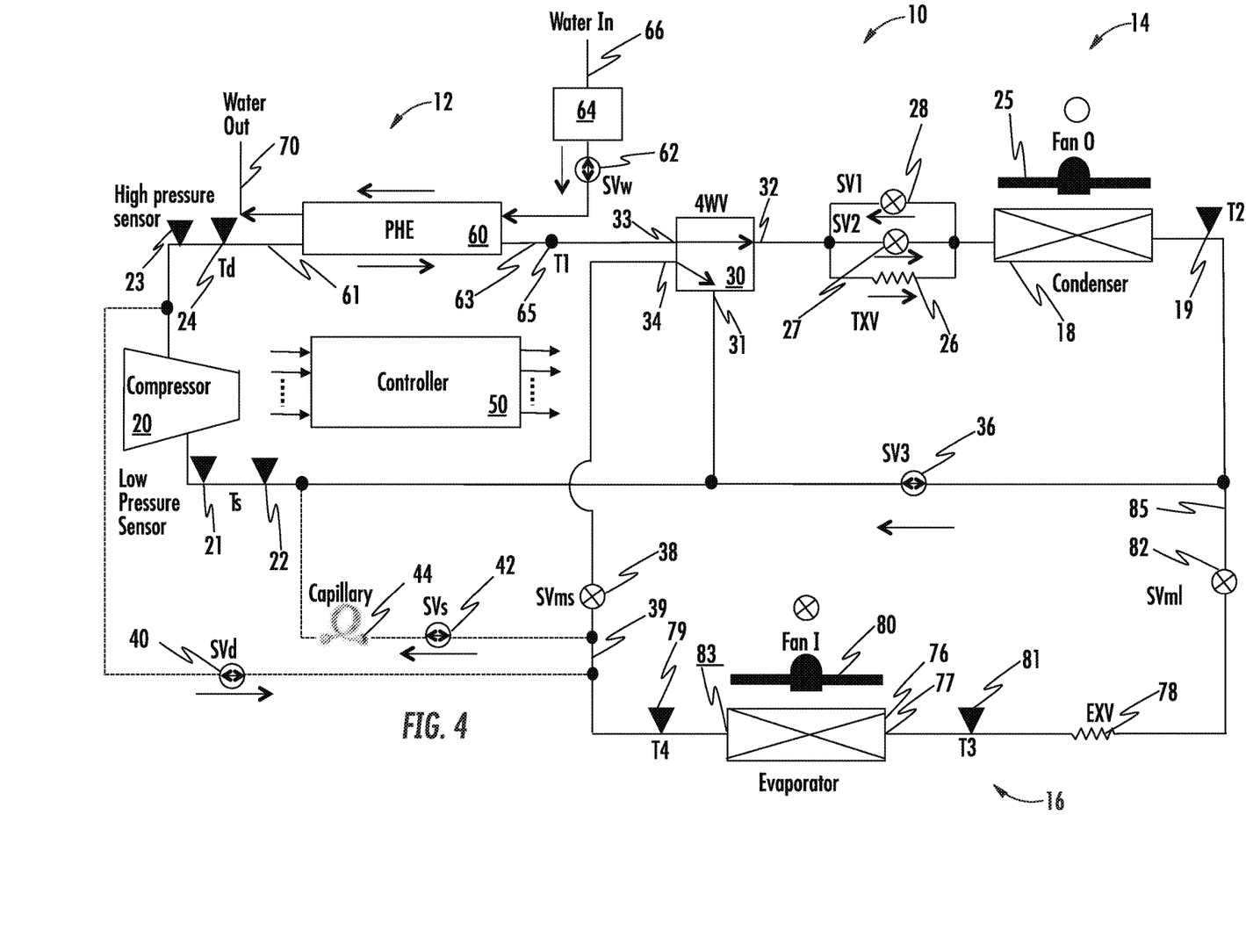
FIG. 4 is a schematic diagram of a system for heating water and conditioning an interior space in hot water heating mode accordance with an embodiment.

FIG. 4 depicts a configuration for the multi-purpose system 10 for heating water and conditioning an interior space in a water heating only mode. In this embodiment, the system 10 operates as a conventional vapor compression cycle to provide water heating via the water heating module 12, particularly when cooling or heating for the building interior space is not provided. In an embodiment, refrigerant is compressed in the compressor 20, exiting the compressor 20 as high pressure, high temperature refrigerant vapor and passes through the heat exchanger 60 of the water heating module 12. Notably, heat is dissipated in the water heater module 12 at this point because based on a call for heated water as described herein, the controller 50 has commanded flow control valve 62, to open. In addition, in this mode, flow control valve 40 denoted SVd is opened in this mode as needed to pass refrigerant as will be discussed later herein. The cooled refrigerant leaving the heat exchanger 60 of the water heating module 12 is directed to the third port 33 of the four-way valve 30, which is in its inactive position. The refrigerant exits the four-way valve 30 at the second port 32 and then passes through the thermal expansion valve 26. Flow control valves 27 and 28 are commanded by controller 50 to an inactive state in this operating mode for the system 10 in order to direct the flow of refrigerant through the thermal expansion valve 26. The thermal expansion valve 26 meters the flow of refrigerant, which is then expanded and directed to the heat exchanger 18 of the outdoor unit 14 to evaporate the refrigerant. Controller 50 provides commands to the fan 25 to operate and provide ambient heat (typically from atmosphere (or the ground for heat pump applications)) to evaporate the refrigerant. The refrigerant evaporated refrigerant is then transmitted to via flow control valve 36, which is now commanded to the open state by the controller 50, to the suction side of the compressor 20 to repeat the refrigerant thermal cycle. It is noteworthy that flow control valve 82 and flow control valve 38 are closed in this mode, so that branch in the circuit passes no refrigerant.

In this mode of operation for the system 10 it is commonly noted that because the circuit connected to most of the indoor unit 16 is not employed, the volume refrigerant in the system 10 that is sufficient for the regular cooling and heating as described with respect to FIGS. 2 & 3 becomes excessive when operating with a reduced system volume in the water heating only mode. As such, in an embodiment the volume of the indoor unit 16 and specifically the heat exchanger 76 is employed as storage for the excess refrigerant. In operation, the controller 50 monitors the discharge pressure of the refrigerant leaving the compressor 20 and commands flow control valve 40 to the open position. This approach permits high pressure, high temperature refrigerant to be directed to fill the volume of the conduits and heat exchanger 76 of the indoor unit 16 to the discharge pressure from the compressor 20. Flow control valves 82 and 38 are commanded by the controller 50 to a closed state to maintain the refrigerant within the indoor unit 16. It should be noted that the fan 80 is typically inoperative during this operating mode for the system 10. Finally, to satisfy any additional refrigerant demand, refrigerant may be directed out of the heat exchanger 76 via conduit 39 through flow control valve 42, which is commanded by the controller 50 to an open state, to a small capillary tube 44 or another type flow restriction to the suction side of the compressor 20. In an embodiment, a capillary tube 44 is employed to ensure only vaporized refrigerant is passed to the suction side of the compressor 20. As is conventionally known, avoiding supplying liquid refrigerant to the compressor ensures proper operation and avoids potential damage.

Figure 5:
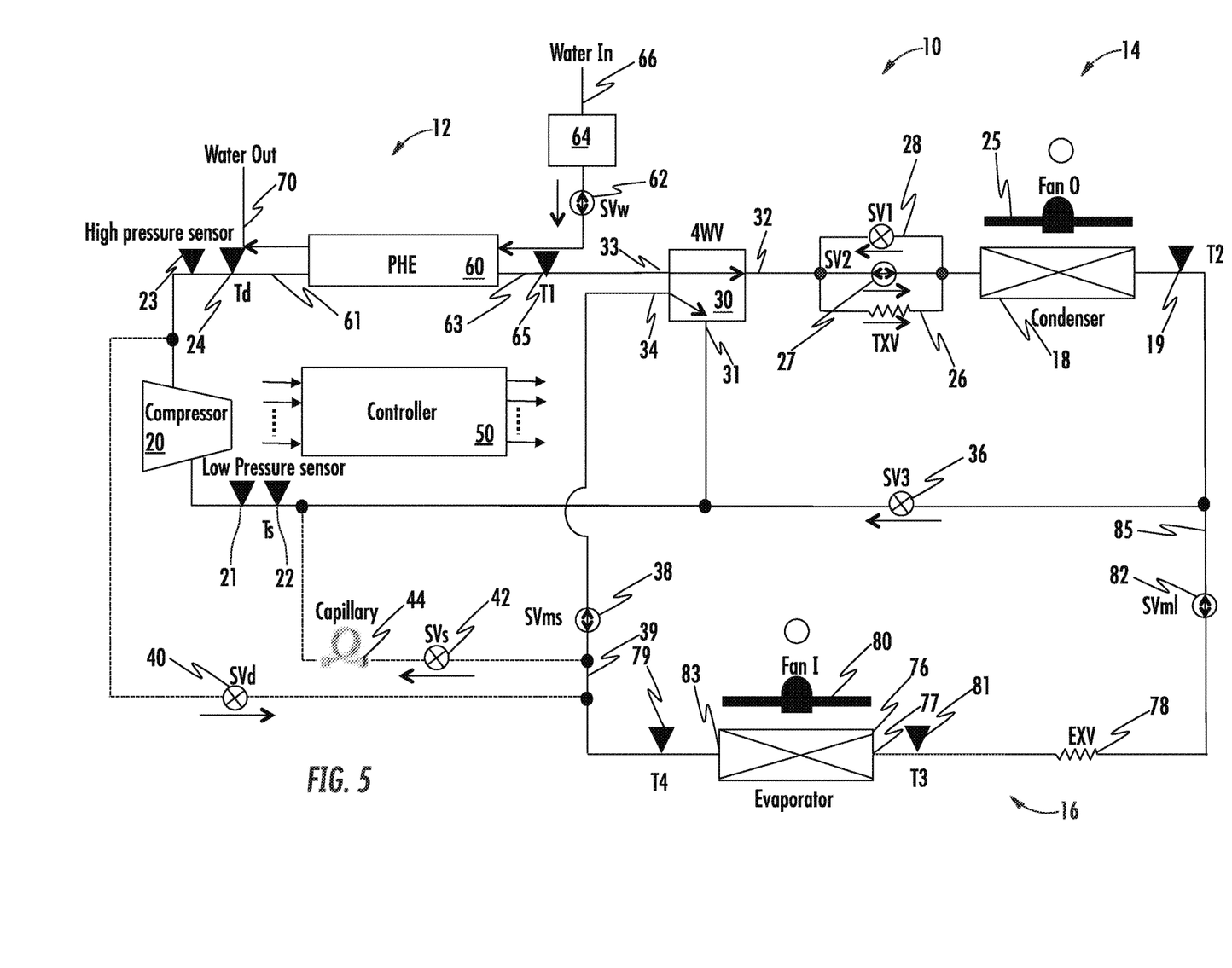
FIG. 5 is a schematic diagram of a system for heating water and conditioning an interior space in a cooling and hot water heating mode in accordance with an embodiment.

FIG. 5 depicts a configuration for the multi-purpose system 10 for heating water and conditioning an interior space in a cooling and water heating mode. In this embodiment, the system 10 operates as a conventional vapor compression cycle to provide water heating via the water heating module 12 similar to that described with respect to FIG. 4 as well as cooling for the interior space similar to that described with respect to FIG. 2. In an embodiment, refrigerant is compressed in the compressor 20, exiting the compressor 20 as high pressure, high temperature refrigerant vapor and passes through the heat exchanger 60 of the water heating module 12. Notably, heat is dissipated in the water heater module 12 at this point because there is a call for water heating and as a result, the controller 50 has commanded the flow control valve 62, to the open state. In addition, flow control valve 40 denoted SVd is closed in this mode and therefore this branch passes no refrigerant.

The high pressure partially cooled refrigerant leaving the heat exchanger 60 is directed to the third port 33 of the four-way valve 30, which for this mode of operation is commanded by the controller 50 to the inactive (or non-reversing) state. The refrigerant exits the four-way valve 30 at the second port 32 and then passes through flow control valve 27 (SV2), which the controller 50 has commanded to the open position, and then on to the heat exchanger 18 of the outdoor unit 14 to dissipate heat (typically to atmosphere (or the ground for heat pump applications) and condense. Once again, flow control valve 27 when activated bypasses flow control valve 28 and the thermal expansion valve 26 in this operating mode for the system 10. The cooled refrigerant is then transmitted to via conduit 85 and flow control valve 82, also denoted SVml and on to the electronic expansion valve 78. Once again, flow control valve 36 is maintained closed in this mode, so that branch in the circuit passes no refrigerant. The electronic expansion valve 78 controls the flow of refrigerant to passing therethrough in a conventional manner and directed to port 77 the heat exchanger 76 of the indoor unit 16 where the refrigerant is evaporated. Fan 80 operates to direct air from the building space over the heat exchanger 76 thereby cooling the air as with the earlier embodiments. Refrigerant is then directed out of the heat exchanger via port 83 through flow control valve 38 (SVms), which is controlled to the open position to the fourth port 34 of the four-way valve 30. The refrigerant exits the first port 31 of the four-way valve 30 to be directed to the suction side of the compressor 20 and repeat the cycle. Once again it should be noted that controller 50 has commanded flow control valves 36, 42, and 40 all commanded to the closed in this mode of operation for the system.

Figure 6:
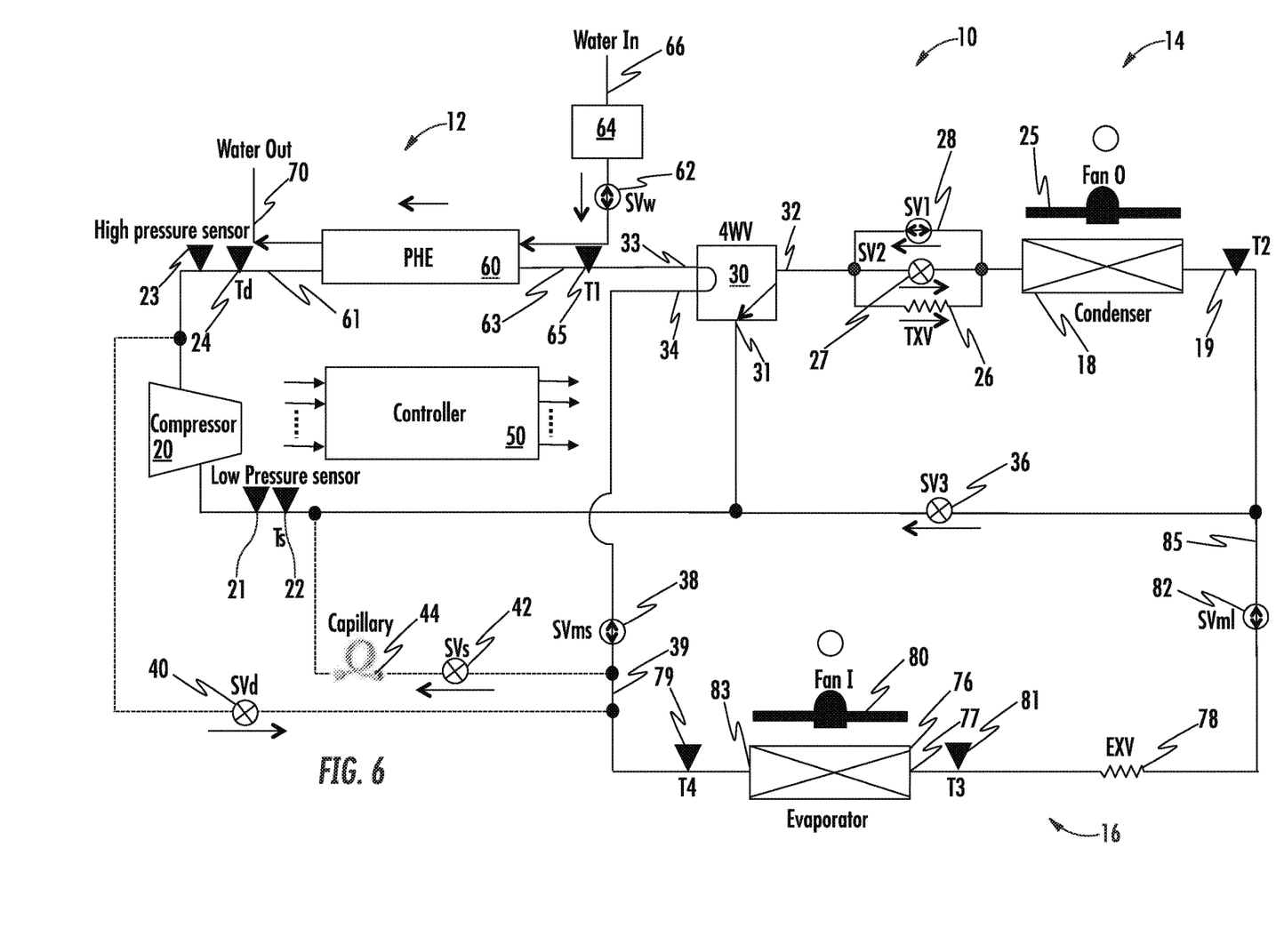
FIG. 6 is a schematic diagram of a system for heating water and conditioning an interior space in a heating and hot water heating mode in accordance with an embodiment.

FIG. 6 depicts a configuration for the multi-purpose system 10 for heating water and conditioning an interior space in a heating and water heating mode. In this embodiment, the system 10 operates as a conventional vapor compression cycle to provide heating via the water heating module 12 as well as heating to an interior space similar to that described with respect to FIG. 3. In an embodiment, refrigerant is compressed in the compressor 20, exiting the compressor 20 as high pressure, high temperature refrigerant vapor and passes through the heat exchanger 60 of the water heating module 12. Notably, heat is dissipated in the water heater module 12 at this point because the flow control valve 62, is commanded to the open state and there is a call for water heating. In addition, flow control valve 40 denoted SVd is closed in this mode and therefore this branch passes no refrigerant.

The high pressure partially cooled refrigerant leaving the heat exchanger 60 is directed to the third port 33 of the four-way valve 30. In this mode, the controller 50 has directed the four-way valve 30 to the reversing state. The refrigerant exits the four-way valve 30 at the fourth port 34 and then passes through flow control valve 38 (SVs), which is commanded to the open state, and then on to port 83 of the heat exchanger 76 of the indoor unit 16 to condense and dissipate heat (to the building space). Fan 80 operates to direct air from the building space over the heat exchanger 76 thereby heating the air. Once again it should be noted that flow control valves 36, 42, and 40 are all closed in this mode of operation for the system 10. The now cooled refrigerant exits port 77 of the heat exchanger 76 and is then transmitted to, and metered by electronic expansion valve 78. Controller 50 directs the operation of the electronic expansion valve 78 to then control the flow of refrigerant passing therethrough in a conventional manner. Refrigerant exiting the electronic expansion valve 78 is directed to flow control valve 82 (SVml) and via conduit 85, on to the heat exchanger 18 of the outdoor unit 14 where the refrigerant is evaporated Controller 50 has commanded flow control valve 36 to the closed position in this mode, so that branch in the circuit passes no refrigerant. Evaporated refrigerant is then directed through flow control valve 28, (SV1), which is commanded to the open position by the controller 50 and then to the second port 32 of the four-way valve 30. The refrigerant exits the first port 31 of the four-way valve 30 to be directed to the suction side of the compressor 20 and repeat the cycle. Flow control valve 28 bypasses flow control valve 27 and the thermal expansion valve 26 in this operating mode for the system 10.

Figure 7:
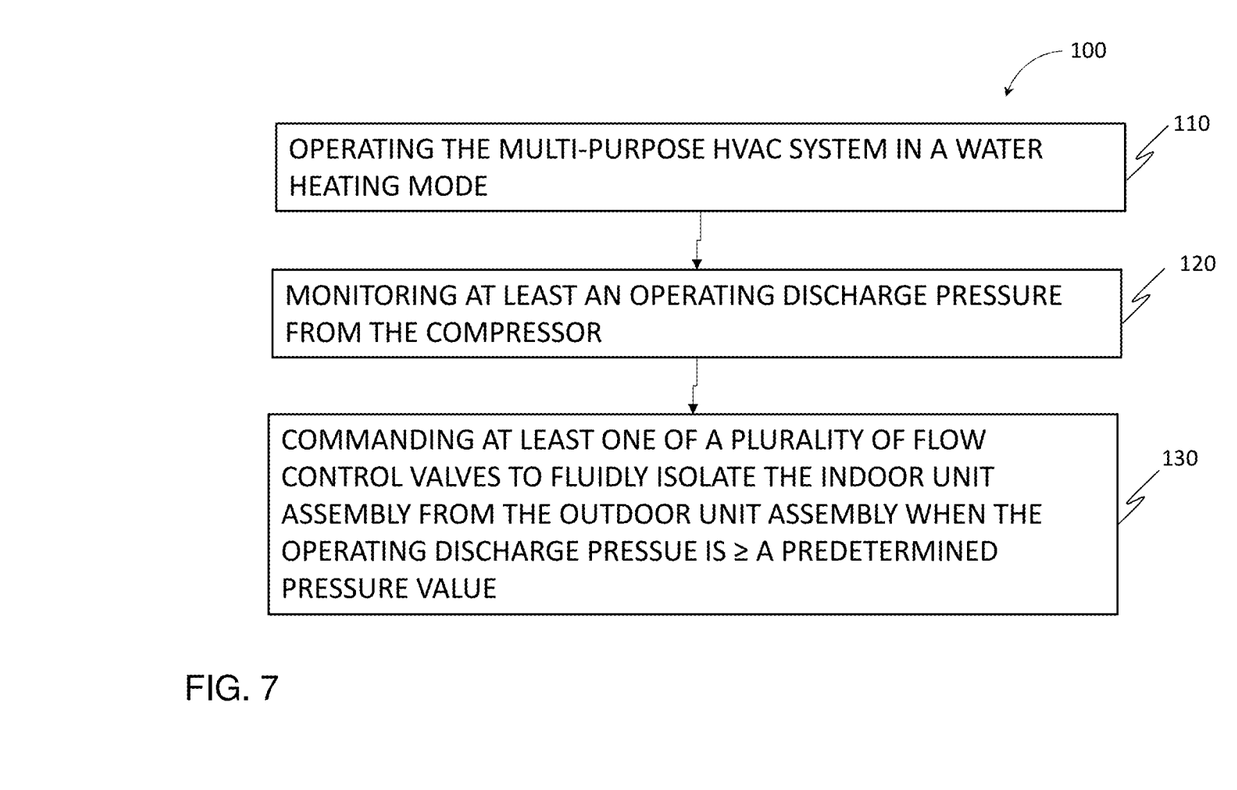
FIG. 7 is a method for controlling a discharge pressure in a system for heating water and conditioning an interior space in accordance with an embodiment.

FIG. 7 depicts a method 100 of controlling the desired refrigerant charge and discharge pressure in accordance with an embodiment. The multi-purpose HVAC system 10 includes an outdoor unit assembly 14, and an indoor unit assembly 16 and a water heating module 12. The multi-purpose HVAC system 10 also includes a plurality of flow control valves 30, 36, 38, 40, 42, 82 configured to isolate a the indoor unit assembly 16 from the multi-purpose HVAC system 10, a compressor 20, and a controller 50, The controller 50 is operably coupled to at least a water heater module 12, the water heater module 12 including at least one valve 62. In an embodiment, the method 100 for controlling an operating discharge pressure in a multi-purpose HVAC system 10 initiates at process step 110 with operating the multi-purpose HVAC system 10 in a water heating mode. The method 100 continues with monitoring at least an operating discharge pressure of the refrigerant from the compressor 20 as depicted at process step 120. At process step 130 the method 100 continues with operating the controller 50 to produce a signal commanding at least one of the plurality of control valves 27, 28, 30, 36, 38, 40, 42, 62, and 82 to isolate the indoor unit assembly 16 from the outdoor unit assembly 14 and water heating module 12 and direct high pressure refrigerant to the indoor unit assembly 16 when the operating discharge pressure is greater than or equal to a predetermined pressure value.

It will be appreciated that a technical feature of the described embodiments includes that the controller 50 in communication with the electronic expansion device 78 can expand the orifice therein to regulate the discharge pressure from the compressor 20 along with the flow control valves 27, 28, 30, 36, 38, 40, 42, 82 to keep the multi-purpose HVAC system 10 operating in multiple modes without the need for additional pressure relief devices or storage devices for excess refrigerant and compressor discharge pressures.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The present embodiments may be a system, a method, and/or a computer program product at any possible technical detail level of integration. The computer program product may include a computer readable storage medium (or media) having computer readable program instructions thereon for causing a processor to carry out aspects of the present disclosure.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

What is claimed is:

1. A method for controlling an operating discharge pressure in a multi-purpose HVAC system including an outdoor unit assembly and an indoor unit assembly, the HVAC system including a plurality of control valves, a compressor and a controller operably coupled to a water heating module, the controller executing the method comprising:
   operating the multi-purpose HVAC system in a water heating mode;
   operating the controller to monitor at least an operating discharge pressure from the compressor; and
   operating the controller to produce a signal commanding at least one of the plurality of control valves to isolate the indoor unit assembly from a heat exchanger of the outdoor unit assembly and the water heating module and direct high pressure refrigerant to the indoor unit assembly when the operating discharge pressure is greater than or equal to a predetermined pressure value.

2. The method of claim 1, further including operating the controller to remove the signal commanding at least one of the plurality of control valves to isolate the indoor unit assembly from the heat exchanger of the outdoor unit assembly and the water heating module when the operating discharge pressure is less than the predetermined pressure value.

3. The method of claim 1, further including operating the controller to remove the signal commanding at least one of the plurality of control valves to isolate the indoor unit assembly from the heat exchanger of the outdoor unit assembly and the water heating module when the multi-purpose HVAC system stops operating in the water heating mode.

4. The method of claim 1, wherein the at least one of the plurality of control valves comprises a four-way valve.

5. The method of claim 1, wherein the at least one of the plurality of control valves comprises:
   a first valve coupled to an inlet of a heat exchanger configured to transfer heat to water;
   a second valve having a first side coupled to a heat exchanger of the outdoor unit, and a second side coupled to the indoor unit in fluid communication with an outlet of a heat exchanger of the indoor unit;
   a third valve having a first side coupled to an inlet to the heat exchanger of the indoor unit and a second side coupled to a fourth port of a four way valve;
   a fourth valve having an inlet coupled to a discharge port on the compressor and an outlet coupled to the inlet to the heat exchanger of the indoor unit; and
   wherein the operating the controller to produce a signal comprises opening the first and fourth valves and closing the second and third valves.

6. The method of claim 1, wherein the at least one refrigerant circuit circulates a refrigerant from the outdoor unit assembly[H] through the water heating module and returns to the outdoor unit assembly.

7. The method of claim 1, further including controlling a flow of refrigerant into the heat exchanger of the outdoor unit in a water heating only operating mode for the multi-mode HVAC system with a refrigerant flow control device, the refrigerant flow control device comprising an expansion valve.

8. The method of claim 7, further including bypassing the refrigerant flow control device when not operating the multi-mode HVAC system in a water heating only mode.

9. The method of claim 1, further including controlling a superheat value of the HVAC system with an electronic expansion valve, the electronic expansion valve in fluid communication with a heat exchanger of the indoor unit assembly.

10. The method of claim 1, further including maintaining a desired refrigerant level in the HVAC system with a flow restriction in fluid communication with a suction port of the compressor and at least one of the plurality of control valves in fluid communication with an inlet to the heat exchanger of the indoor unit.

11. A multi-purpose HVAC system comprising:
an outdoor unit assembly including a compressor, a four-way valve, an expansion valve and a heat exchanger;
an indoor unit assembly;
a water heating module including a heat exchanger;
a controller operably connected to the outdoor unit assembly, indoor unit assembly and the water heating module; and
a plurality of conduits operatively coupling the water heating module to the outdoor unit assembly and the indoor unit assembly;
wherein the controller is configured to:
operate the multi-purpose HVAC system in a water heating mode;
monitor the operating discharge pressure from the compressor; and
produce a signal commanding at least one control valve to isolate the indoor unit assembly from a heat exchanger of the outdoor unit assembly and the water heating module and direct high pressure refrigerant to the indoor unit assembly when the operating discharge pressure is greater than or equal to a predetermined pressure value.

12. The multi-purpose HVAC system of claim 11, wherein the at least one control valve is configured in at least one refrigerant circuit to circulate a refrigerant from the outdoor unit assembly through the water heating module and return to the outdoor unit assembly.

13. The multi-purpose HVAC system of claim 11, wherein the controller is further configured to remove the signal commanding the at least one control valve to isolate the indoor unit assembly from the heat exchanger of the outdoor unit assembly and water heating module and direct high pressure refrigerant to the indoor unit assembly when the operating discharge pressure is less than the predetermined pressure value.

14. The multi-purpose HVAC system of claim 11, wherein the at least one control valve comprises:
a first valve coupled to an inlet of the heat exchanger of the water heating module;
a second valve having a first side coupled to a heat exchanger of the outdoor unit, and a second side coupled to the indoor unit in fluid communication with an outlet of a heat exchanger of the indoor unit;
a third valve having a first side coupled to an inlet to the heat exchanger of the indoor unit and a second side coupled to a fourth port of the four way valve;
a fourth valve having an inlet coupled to a discharge port on the compressor and an outlet coupled to the inlet to the heat exchanger of the indoor unit; and
wherein the operating the controller to produce a signal comprises opening the first and fourth valves and closing the second and third valves.

15. The multi-purpose HVAC system of claim 11, further including a refrigerant flow control device configure to control a flow of refrigerant into the heat exchanger of the outdoor unit in a water heating only operating mode for the multi-mode HVAC system, the refrigerant flow control device comprising an expansion valve.

16. The multi-purpose HVAC system of claim 15, further including a flow control valve operably coupled to the refrigerant flow control device and configured to bypass the refrigerant flow control device when not operating the multi-mode HVAC system in a water heating only mode.

17. The multi-purpose HVAC system of claim 11, further including an electronic expansion valve, the electronic expansion valve in fluid communication with a heat exchanger of the indoor unit assembly, the electronic expansion valve device in operable communication with the controller and configured to receive signals therefrom for controlling a superheat value of the HVAC system.

18. The multi-purpose HVAC system of claim 11, further including a flow restriction in fluid communication with a suction port of the compressor and a flow control device in fluid communication with an inlet to the heat exchanger of the indoor unit, the flow control device in operable communication with the controller and configured to maintain a desired refrigerant level in the HVAC system.

* * * * *